United States Patent [19]

Chang-Hasnain et al.

[11] Patent Number: 5,541,756
[45] Date of Patent: Jul. 30, 1996

[54] APPARATUS AND METHOD FOR ROUTING OPTICAL SIGNALS THROUGH WAVELENGTH-CODING IN A SELF-ROUTED WAVELENGTH ADDRESSABLE NETWORK

[75] Inventors: Constance J. Chang-Hasnain, Stanford; Kam-Yin Lau, Danville; Joseph W. Goodman, Los Altos; Anujan Varma, Santa Cruz, all of Calif.

[73] Assignee: Board of Trustees of the Leland Stanford Junior Universty, Stanford, Calif.

[21] Appl. No.: 341,654

[22] Filed: Nov. 17, 1994

[51] Int. Cl.[6] ................................ H04J 4/00; H04J 14/00
[52] U.S. Cl. ........................ 359/123; 359/128; 359/165
[58] Field of Search ........................ 359/123, 120, 359/128, 117, 129–130, 138–139, 165

[56] References Cited

U.S. PATENT DOCUMENTS 5,278,689 1/1994 Gitlin et al. ...................... 359/139

Primary Examiner—Leo Boudreau
Assistant Examiner—Kinfe-Michael Negash
Attorney, Agent, or Firm—Marek Alboszta

[57] ABSTRACT

A network and method for routing optical signals through wavelength-coding of routing tags belonging to the optical signals. The routing tag preferably consists of one or more header pulses $S_i$ which are chosen from among header wavelengths $\lambda_{hi}$. Preferably, the header wavelengths $\lambda_{hi}$ are different from wavelengths used by the data. The optical signal also has reset tag containing preferably one reset pulse R preferably having a unique reset wavelength $\lambda_r$. The optical data is contained between the routing tag and the reset tag. The network has a splitter for dividing the optical signal into two or more split optical signals, which are copies of the original optical signal. A wavelength differentiating element is positioned in the path of one of the split optical signals to differentiate and preferably spatially resolve the header wavelengths of the header pulses. An opto-electronic control system, consisting of opto-electronic sensors and an electronic control circuit, generates electronic control signals based on the wavelength-coded information in the header tag. These electronic control signals are used to route one or more of the split optical signals through an optical switch. The network can be made up of one simple switch or a large number of complex switches.

22 Claims, 8 Drawing Sheets

APPARATUS AND METHOD FOR ROUTING OPTICAL SIGNALS THROUGH WAVELENGTH-CODING IN A SELF-ROUTED WAVELENGTH ADDRESSABLE NETWORK

BACKGROUND

1. Field of the Invention

The present invention relates to the field of optical signal processing, and in particular to self-routing of optical signals through wavelength-coded addressing in a Self-Routed Wavelength Addressable Network (SWANet).

2. Description of Prior Art

Our civilization's need for rapid transmission of large amounts of information places a heavy burden on conventional, communication networks based on electronic processing of signals. Data transfer is slow due to long delays introduced by electrical switching elements and limited bandwidth of transmission media. All-optical networks (AONs) promise to alleviate these problems and deliver transmission rates in excess of 25,000 GHz.

Unfortunately, AON technology is shackled by electronic and opto-electronic elements required for performing switching and routing functions. The conversion of high-speed optical data to electrical signals is associated with a tremendous reduction in speed. This speed mismatch introduces a series of wavelength and data-format limitations which render the network inefficient. Switching methods and corresponding elements capable of routing signals optically without optical-to-electrical and electrical-to-optical conversion of high-speed data would obviate these problems.

One solution to these problems is presented by passive optical networks (PONs). The communications paths in these systems are completely passive and serve to transmit signals from a central star hub. Amplification stages are permitted in such systems but no signal-induced switching is performed thus circumventing the above problems. Typically, the data is transmitted simultaneously in several channels which are separated by their optical wavelengths. This transmission technique is called wavelength-division multiplexing (WDM).

Since the optical power is partitioned between all the receivers connected to the hub the maximum data transmission capacity is limited by the power budget alone. In addition, the tuning range of the laser transmitters and/or receivers is restricted to only about 10 nm. High-speed, tunable filters have even smaller tuning ranges, typically in the Angstrom range. In view of these limitations PONs are only effective for small number of nodes and short transmission distances, or special applications such as broadcast TV distribution. Moreover, the optical signals are finally converted into electrical signals at the end-nodes of the PON, where only a limited amount of data can be transformed by electronic elements for further use.

AON architectures for dynamic networks have been proposed recently as well. The first, called Transparent All-Optical Network, is based on preserving transparency of each wavelength channel but allowing manipulation of the individual channels by devices such as wavelength converters. No optical-electrical conversion is performed within the network, but the network can still be dynamically reconfigured in the wavelength domain.

The most serious problem with these networks is that at the present the only practical means of achieving wavelength conversion is through some form of electronic detection and remodulation onto source of different wavelength. Thus, the optical-electrical conversion problem is only postponed but not avoided.

The second type of dynamic AONs is based on multiplexing extremely short optical pulses or solitons in the time domain. Switching is accomplished in these networks by time-shift keying, that is by time-shifting the optical pulse with respect to a reference window. This technique is described in "Generalized Exclusive-OR Modules and All-Optical Time Slot Interchangers", Photonic Switching, 1991, Technical Digest Series, Optical Society of America, Washington, D.C., pp. 136–139. Unfortunately, the fine tolerances in timing and delay compensation for typical solitons on the order of a few picoseconds or less at different geographical stations present a serious problem. Thus, the efforts in managing and determining proper adjustments render it infeasible for use in large communications networks. In view of the above the transition to economical AONs with dynamic capabilities appear insurmountable. Ultimately, it is the opto-electronic and electronic-optic conversion process which poses the real limitation to future advances in optical communications. Only a switch capable of solving this problem and avoiding optical data conversion can be used in an efficient AON.

OBJECTS AND ADVANTAGES OF THE INVENTION

Consequently, the object of the present invention is to provide a switch capable of routing optical data without subjecting it to opto-electronic conversion.

Furthermore, it is the object of the invention to ensure that such switch has all the necessary requisites for deployment in dynamic All-Optical Networks.

Finally, it is also the object of the invention to lay down a format for transmitting optical data in dynamic All-Optical Networks using the switches of the invention.

These and other objects and advantages will become more apparent after consideration of the ensuing description and the accompanying drawings.

SUMMARY OF THE INVENTION

The invention relates to a network and a method for routing optical signals provided with wavelength-coded routing tags comprising at least one header pulse $S_i$ having at least one header wavelength $\lambda_{hi}$, at least one reset pulse R having at least one reset wavelength $\lambda_r$, and a set of optical data following wavelength-coded routing tag.

The network contains a splitting element, preferably a beam splitter or an unequal coupler, for splitting the optical signal into at least two split optical signals which are copies of the original optical signal. Further, the network has a wavelength differentiating element positioned in the path of at least one of the split optical signals. The wavelength differentiating element is preferably a precision grating for determining the header wavelength $\lambda_{hi}$ by diffraction. The network also includes an opto-electronic control system for generating electronic control signals upon determining the header wavelength $\lambda_{hi}$ by the grating. Finally, the network comprises one or more optical switches in communication with the opto-electronic control system for altering the path of at least one of the at least two split optical signals in response to the electronic control signals.

A complete description of the invention follows. The description makes reference to the attached drawing figures.

DESCRIPTION

Figure 1:
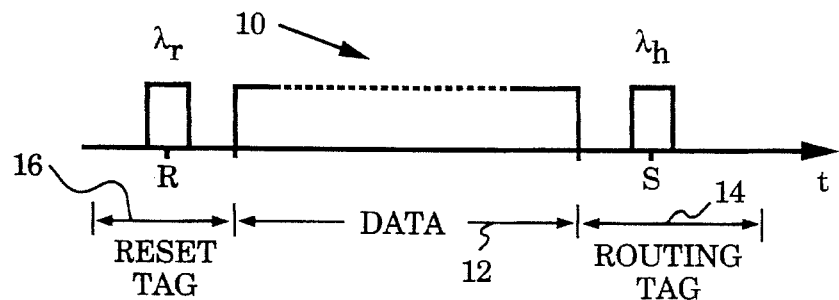
FIG. 1 is a diagram of a set of optical data formatted for transmission in the network of the invention.

The present invention will be best understood by first considering the format it prescribes for optical signals with data contents. FIG. 1 presents a diagram of a simple optical signal 10 formatted for transmission in the network of the invention. Signal 10 consists of data 12, a routing tag 14 and a reset tag 16. Data 12 consists of any data used in optical data communications and exhibits any permissible data wavelength range $\Delta\lambda$. In particular, data 12 can be coded according to any protocol, including wavelength division multiplexing (WDM), as dictated by the receiving station, which is not a part of this invention. However, data 12 does not contain any information for optical routing of that data in the present network.

Routing tag 14 consists of a header pulse S, which is an optical pulse of a particular header wavelength $\lambda_h$. In practice, routing tag 14 can be more complex. Optical signal 18 in FIG. 2 has a routing tag 19 which consists of many independent header pulses $S_1, S_2, \ldots S_M$ with corresponding header wavelengths $\lambda_{h1}, \lambda_{h2}, \ldots \lambda_{hM}$. The separation between individual header pulses $S_1, S_2, \ldots S_M$ and data 12 is dictated by resolution criteria, electro-optical processing delays, and dispersion of optical transmission media, as discussed below. Header wavelengths $\lambda_{h1}, \lambda_{h2}, \ldots \lambda_{hM}$ can have any values, but are preferably different than any wavelengths contained in the permissible wavelength range $\Delta\lambda$ for data 12.

Preferably, there are K discrete values from which each header wavelength can be chosen, i.e. $\lambda_h = \{\lambda_1, \lambda_2, \ldots \lambda_K\}$. Furthermore, the K discrete wavelength values preferably differ by about 1 nm. Of course, with high-precision optical elements even smaller wavelength separation is possible.

Figure 2:
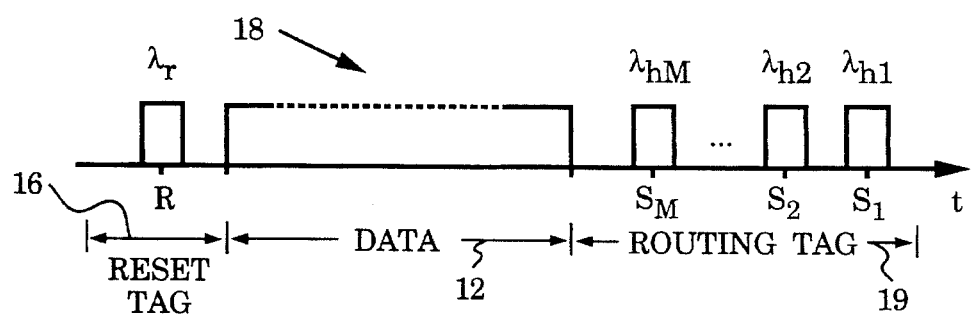
FIG. 2 is a diagram of a more complex set of optical data for transmission in the network of the invention.
Figure 3:
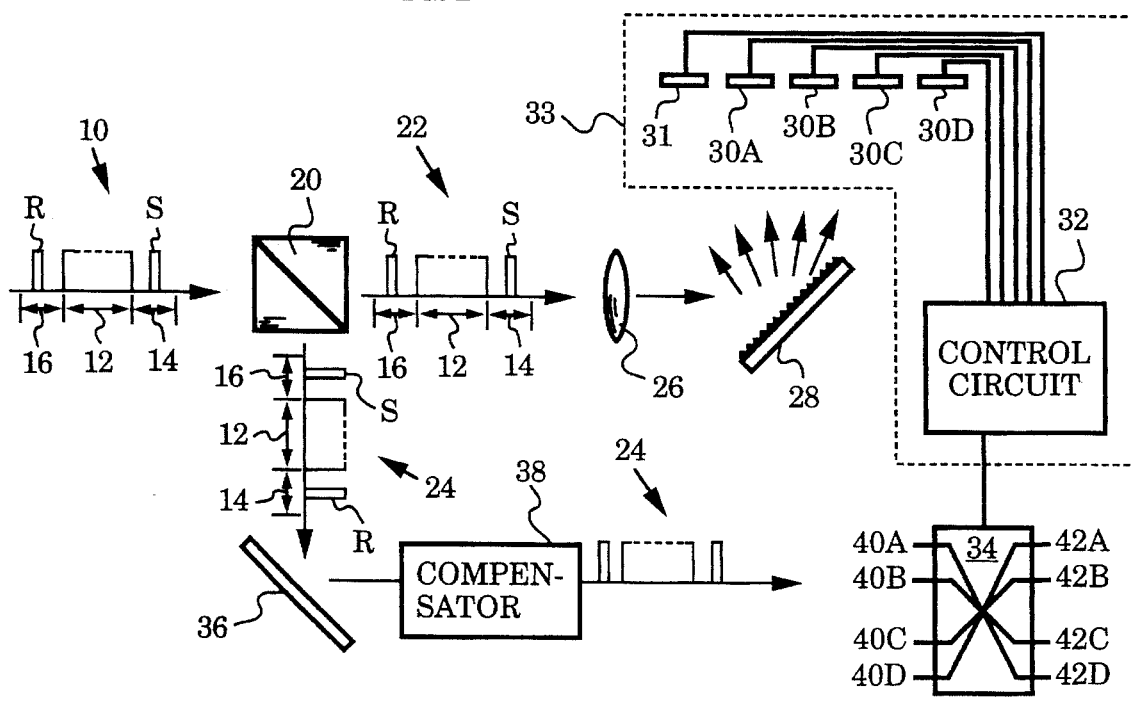
FIG. 3 is a schematic block diagram showing the fundamental mode of operation of a basic optical switch according to the invention.

In both FIG. 1 and FIG. 2 reset tag 16 consists of a single reset pulse R with a reset wavelength $\lambda_r$ having any suitable value. Preferably, reset wavelength $\lambda_r$ is chosen from among wavelengths different from the possible header wavelengths $\lambda_1, \lambda_2, \ldots \lambda_K$ and not contained in the permissible wavelength range $\Delta\lambda$ for data 12. The separation between reset tag 16 and data 12 is also dictated by resolution criteria, electro-optical delays, and dispersion discussed below. FIG. 3 illustrates a simple preferred embodiment of the invention in an optical switch for optical signal 10 formatted according to FIG. 1. In this case header wavelength $\lambda_h$ can assume four values (K=4, $\lambda_h = \lambda_1, \lambda_2, \lambda_3, \lambda_4$) and reset wavelength $\lambda_r$ has a separate, dedicated value $\lambda_5$. Of course, reset wavelength $\lambda_r$ can be chosen from among the same values as header wavelength $\lambda_h$. However, a distinct wavelength is preferable because it provides a unique reset signal which can be used in case of system malfunctions.

Signal 10 arrives through a waveguide such as a fiber-optic cable and appropriate optics (not shown). An optical beam divider or beam splitter 20 is positioned in the path of in-coming signal 10 to produce two split optical signals 22 and 24. These are copies of original signal 10, including routing tag 14, data 12, and reset tag 16, but exhibit a lesser intensity. (Of course, undue losses in intensity can be compensated by guiding split optical signals 22 and/or 24 through suitable optical amplifiers (not shown).)

Preferably, beam splitter 20 is designed to cleave signal 10 unevenly such that split optical signal 22 is much less intense than split optical signal 24. Thus signal 22 is a low intensity optical signal and signal 24 is a high intensity optical signal. For example, the intensity of signal 22 could equal about 5–10% of signal 10 and that of signal 24 about 90–95% of signal 10. Appropriate intensity ratios can be easily set by using state-of-the-art methods.

After exiting splitter 20 signal 22 propagates to focussing optics 26. In the simplest embodiment optics 26 include a converging lens which directs signal 22 to grating 28. In other instances optics 26 can include additional lenses, diaphragms, and elements for collimating, high-precision focussing, and/or otherwise shaping signal 22. Precise control and optimization of optical parameters of signal 22 at grating 28 to improve wavelength resolution is within the ability of one skilled in the art. Grating 28 serves as a wavelength differentiator. It is preferably a spectrograph-quality grating capable of resolving wavelength differences of 0.25 nm or less by diffracting them at different angles. In this particular embodiment grating 28 is 2 cm long and has 1,200 lines/mm. This ensures a dispersion of 16 nm/mm and a resolution of 0.25 nm.

Five opto-electronic detectors or photo-electric sensors 30A, 30B, 30C, 30D, and 31 are arranged above grating 28 to intercept light diffracted at different diffraction angles. Sensors 30A, . . . 30D, and 31 are able to detect and convert into electrical signals header and reset wavelengths $\lambda_h$, $\lambda_r$ of optical signal 22. Photodiodes, charge-coupled devices, phototransistors and the like can be used advantageously to satisfy this function. Further, since header wavelengths $\lambda_h$ can assume four possible values, each of four sensors 30A, . . . 30D is preferably set up to receive header pulse S having one of these discrete wavelength values and convert it into a corresponding electrical signal. Meanwhile, sensor 31 is positioned at the diffraction angle characteristic of reset wavelength $\lambda_r$.

In this embodiment grating 28 is set up to diffract the five possible header and reset wavelengths in order from the shortest to the longest to sensors 30A, 30B, 30C, 30D, and 31 respectively. Thus, when header wavelength $\lambda_h$ is shortest, $\lambda_h = \lambda_1$, header pulse S is projected on sensor 30A. Header pulse S with the next longer wavelength $\lambda_h=\lambda_2$ is diffracted to sensor 30B, while header wavelengths $\lambda_h=\lambda_3$, $\lambda_h=\lambda_4$ cause header pulse S to be sent to sensors 30C and 30D respectively. Analogously, reset wavelength $\lambda_r$ is always diffracted to sensor 31 causing reset pulse R to be sent there.

Each sensor 30A, 30B, 30C, 30D, and 31 is electrically connected to a control circuit 32. Together, the sensors and control circuit 32 constitute an opto-electronic control system 33, as indicated by the broken line in FIG. 3. Circuit 32 is programmed to receive the electrical signals generated by sensors 30A, 30B, 30C, 30D, and 31 upon detection of header pulse S or reset pulse R. Thereupon, circuit 32 issues a corresponding electronic control signal to change the setting of an opto-electronic router or optical switch 34. Optical switch 34 can use any known optical mechanisms. For example, switch 34 can be a LiNbO$_3$ directional coupler, an optical shutter, a semiconductor waveguide directional coupler, a semiconductor Y-branch switch, a semiconductor amplifier gating switch, a polarizing liquid crystal switch, or even a mechanical switch. The preferred choice and one used in this embodiment is a LiNbO$_3$ directional coupler.

In switching methods using LiNbO$_3$ a signal is routed by applying a voltage to change the optical transmission qualities of switch 34. In the simple preferred embodiment switch 34 is designed to route an incoming optical signal from one of its inputs 40A, 40B, 40C, 40D to one of its four outputs 42A, 42B, 42C, 42D depending on the electronic control signal. Also, switch 34 can become opaque to all optical signals when an appropriate voltage is applied.

Meanwhile, split optical signal 24 is directed from splitter 20 to guiding optics 36 and to one of inputs 40A, 40B, 40C, 40D of switch 34. In the present embodiment a simple reflector constitutes guiding optics 36. Of course, elements such as collimating lenses, diaphragms, and focussing lenses can be included to ensure proper guidance of signal 24. In a preferred embodiment a compensator 38 is placed in the path of signal 24 to adjust the time at which signal 24 arrives at switch 34. Any conventional compensator can be used for this purpose. Of course, the length of the path from splitter 20 to switch 34 can also be varied to effectuate a first-order adjustment.

The simple preferred embodiment of FIG. 3 operates as follows. Upon the splitting of optical signal 10 by splitter 20 split optical signals 22 and 24 propagate toward grating 28 and a selected input, e.g., 40A, of optical switch 34 respectively. Routing tag 14 of signal 22 arrives at grating 28 while signal 24 is still underway. Depending on the value of header wavelength $\lambda_h$ of header pulse S the latter will be diffracted by grating 28 to one of four sensors 30A, 30B, 30C, and 30D belonging to opto-electronic control system 33.

Circuit 32 of control system 33 produces a corresponding electronic control signal and sets switch 34 to transmit split optical signal 24 from input 40A to one of outputs 42A, 42B, 42C, or 42D. In this case, circuit 32 can be programmed to respond to an electrical signal from sensor 30A by issuing an electronic control signal to latch input 40A to output 42A. In a similar vein, electrical signals from sensors 30B, 30C, and 30D prompt circuit 32 to latch input 40A to outputs 42B, 42C, and 42D in that succession. Of course, alternative programming of circuit 32 is also admissible. In fact, the programming does not need to be constant and may change for the next split optical signal. Circuit 32 can even be set to reprogram itself before reset pulse R of signal 22 arrives at grating 28.

Meanwhile, signal 24 bounces off reflector 36, passes through compensator 38, and arrives at input 40A after the latching has taken place. (A trial run will aid in setting compensator 38 to ensure that signal 24 does not arrive at input 40A prematurely, i.e., to afford sufficient time for the opto-electronic conversion of header pulse S of signal 22 into an electrical signal, generation of the electronic control signal by circuit 32, and consequent opto-electrical latching of switch 34.) In this case, if optical signal 10 was originally formatted with header pulse S having header wavelength $\lambda_h=\lambda_1$ switch 34 will latch to pass signal 24 from input 40A to output 42A. For header wavelengths $\lambda_h=\lambda_2$, $\lambda_3$, and $\lambda_4$ signal 24 will be routed to outputs 42B, 42C, and 42D respectively.

Meanwhile, data 12 of signal 22 impinges on grating 28 and is diffracted while data 12 carried by signal 24 is passing through switch 34. For proper operation of switch 34 it is important that data 12 not be confused with any header pulse S by circuit 32. There are two preferred methods for achieving this objective. One, according to the present embodiment, ensures that data 12 is made up of data wavelengths $\lambda_d$ which does not include values permitted for reset wavelength $\lambda_r$. Thus, any signals impinging on sensors 30A, . . . , 30D after the first one will be ignored by circuit 32. The other method is to select data wavelengths $\lambda_d$ from values different than both header and reset wavelengths. Consequently, optical pulses corresponding to data 12 carried by signal 22 will be diffracted away from sensors 30A, . . . , 30D, and 31.

Yet another possible solution is to render sensors 30A, . . . , 30D, and 31 insensitive to any optical pulses representing data 12 by, e.g., shutting off sensors 30A, . . . , 30D, and 31 for the duration of data 12. A person skilled in the art of opto-electronics will be able to devise many other solutions to prevent data 12 from causing sensors 30A, . . . , 30D, and 31 to issue electrical signals to circuit 32 when they could be wrongly attributed to header pulse S.

Thus, header pulse S of signal 22 sets a path for signal 24 and permits the data 12 of signal 24 to be routed through switch 34 without undergoing and opto-electronic conversion. It can be seen that data 12 of signal 22 is superfluous in this arrangement. In fact, data 12 in signal 22 can even be suppressed, filtered out, or scattered before reaching grating 28 without affecting the operation of the switching arrangement.

Finally, reset pulse R of signal 22 arrives and impinges upon grating 28 and is diffracted to sensor 31. As described above, sensor 31 performs an opto-electronic conversion of reset pulse R and sends a corresponding electrical signal to circuit 32. Upon receiving a second electrical signal from sensor 31 circuit 32 produces another electronic control signal which shuts off switch 34 by making it opaque. Of course, various alternative functions are possible with appropriate programming. For example, rather than being shut off, switch 34 can be reset or latched to a default output chosen from among outputs 42.

It is important that proper timing be ensured such that all data 12 of signal 24 manages to pass through switch 34 before the latter is deactivated or reset. Proper timing for maintaining the latched state of switch 34 can be adjusted by adjusting the path length of signal 24 and signal 22 and varying the settings of compensator 38. In essence, the latching of switch 34 produces a temporal "data window" for data 12.

Thus, data 12 originally contained in optical signal 10 is transmitted in split optical signal 24 through switch 34 to one of outputs 42 without itself undergoing any opto-electrical conversion. Moreover, corresponding setting of switch 34 is ensured by coding header pulse S and reset pulse R of optical signal 10 with appropriate header and reset wavelengths. Thus, formatted optical signal 10 is self-routing. The slow opto-electronic conversion and processing of both header pulse S and reset pulse R does not require any decompression of data 12 nor does it impose other electronics-associated limitations. That is because the only function of header pulse S and reset pulse R is to open a temporal "data window". Moreover, header or reset pulses S, R are of much longer duration than the duration of a data bit, so that header pulse S and reset pulse R can be processed by low-speed opto-electronics. Consequently, optical signals formatted according to the invention and the apparatus described possess all prerequisites for constructing dynamic All-Optical Networks.

Since switch 34 has four inputs 40A, ..., 40D it is possible to route four optical signals arriving at different inputs. Any conflicts which may arise from signals arriving within a time that is too short can be resolved by appropriate conflict resolution algorithms. These include, e.g., random, rotational, or any other priority assignment. The relevant methods are well-known to persons skilled in the art of signal processing.

Figure 4:
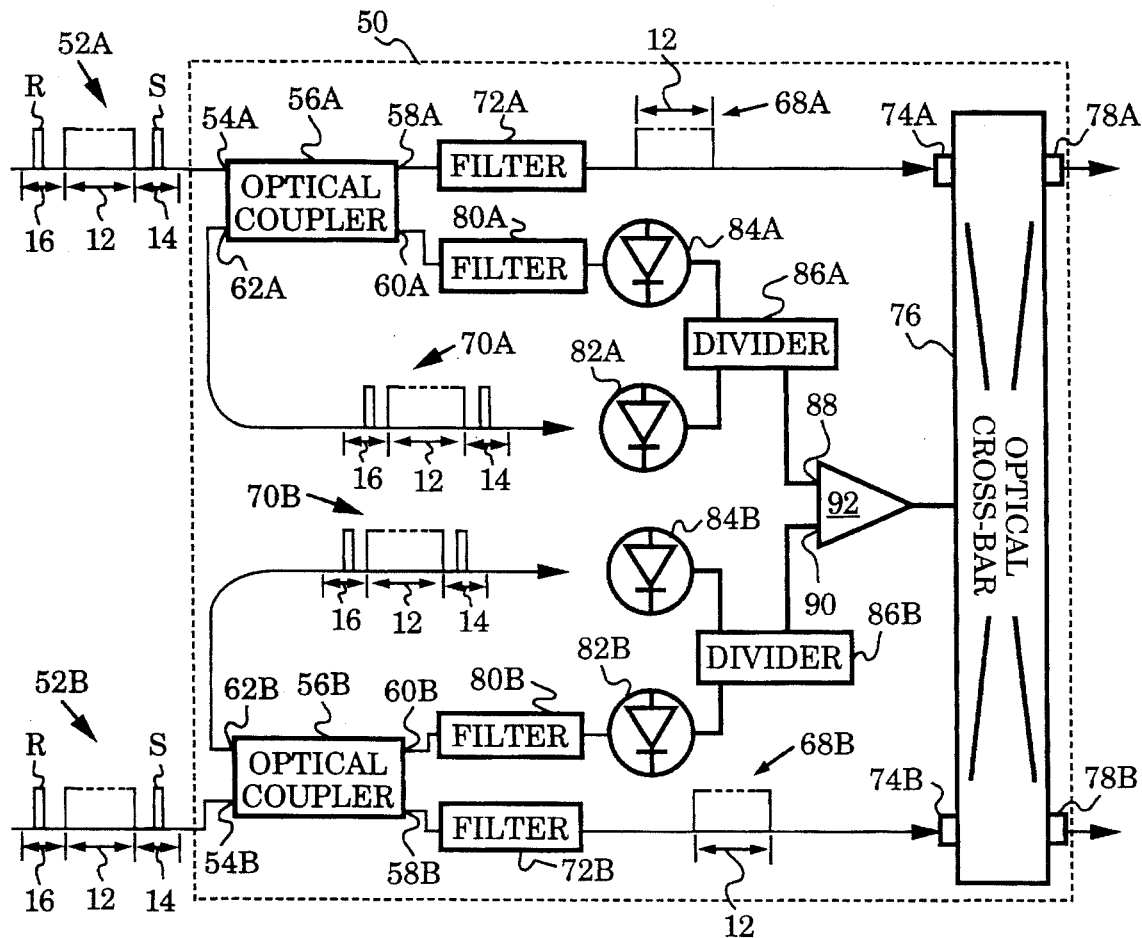
FIG. 4 is a schematic block diagram of a 2×2 optical switch according to the invention.

Another embodiment of the invention is illustrated in FIG. 4 in the form of a 2×2 switch 50 for optical signals formatted according to FIG. 1. In particular, switch 50 is designed to receive optical signals 52A and 52B through input ports 54A and 54B of two unequal optical couplers 56A and 56B. Since both couplers 56A and 56B are followed by analogous arrangements of optical and electronic elements, only the set-up of coupler 56A will be discussed in detail. Corresponding reference numbers terminating in B will lo designate the related elements associated with coupler 56B.

Coupler 56A has three outputs 58A, 60A, and 62A. Output 58A serves for coupling out a first split optical signal 68A, which is a copy of in-coming optical signal 52A. Preferably, signal 68A has an intensity of about 90% of signal 52A.

A gate or filter 72A is situated along the path of signal 68A. Filter 72A eliminates header pulse S and reset pulse R from signal 68A. This can be done by absorption, scattering, or any other well-known operating principles used in state-of-the-art optical filters.

A routing input 74A of an optical cross-bar 76 is situated further along the path of signal 68A. Cross-bar 76 has two sorted outputs 78A and 78B and two routing inputs 74A and 74B. An optical signal entering through either routing input, 74A or 74B, will be directed to one of sorted outputs 78A or 78B depending on the result of a comparison of the values of header wavelengths $\lambda_h$ of optical signals 52A and 52B, as explained further down.

Figure 5A:
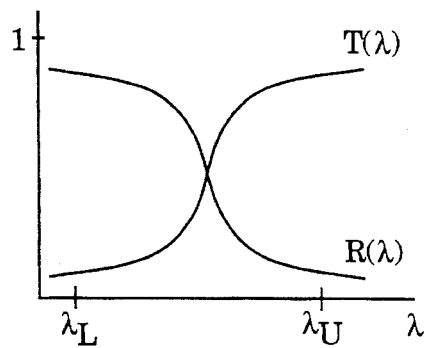
FIG. 5A is a graph of the transmission and reflection characteristics of the optical filters used in the 2×2 optical switch of FIG. 4.

Coupler 56A also produces a second split optical signal 70A which is only 10% as intense as signal 52A. This signal travels to a band-pass filter 80A. The latter has reflection and transmission characteristics as shown in the graph of FIG. 5A. In particular, the reflectivity, $R(\lambda)$, of filter 80A decreases with increasing wavelength $\lambda$ while transmissivity, $T(\lambda)=1-R(\lambda)$, increases. Both reflectivity and transmissivity of filter 80A vary appreciably over a wavelength interval defined by a lower wavelength bound $\lambda_L$ and an upper wavelength bound $\lambda_U$. Possible values for header wavelength $\lambda_h$ and reset wavelength $\lambda_r$ are selected in that wavelength interval. Thus, filter 80A changes its reflection and transmission over the wavelength interval of wavelengths contained in header pulse S and reset pulse R of signal 70A. A low gain Fabry-Perot filter or in-fiber grating can be advantageously used as filter 80A.

Figure 5B:
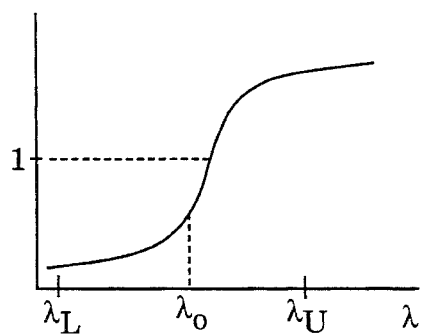
FIG. 5B is a graph of the electrical signals generated as a function of the wavelength of a header or reset wavelength of an incoming optical signal in the 2×2 optical switch of FIG. 4.

Filter 80A thus provides a transmitted and a reflected portion of signal 70A. The reflected portion is re-routed via coupler 56A to a photodiode 82A. The optics for guiding reflected portion of signal 70A are not shown. The transmitted portion of signal 70A passes to photodiode 84A. Both photodiodes 82A and 84A are connected to a divider 86A. As is well-known, photodiodes 82A and 84B will generate photocurrents in response to impinging reflected and transmitted portions of signal 70A. Divider 86A is designed to divide the photocurrents generated by photodiodes 82A and 84A according to a deterministic function, e.g., transmitted portion of signal 70A/0.9×reflected portion of signal 70A. This operation eliminates any potential intensity effects and produces an electrical signal which is only dependent on the wavelength of signal 70A. In fact, since the transmission and reflection characteristics of filter 80A only vary from $\lambda_L$ to $\lambda_U$ divider 86A will produce an electrical response signal which is only sensitive to header pulse S and reset pulse R, as discussed above. The electrical response signal of divider 86A is shown in FIG. 5B.

The output of divider 86A is connected to comparator 92. In particular, comparator 92 has two inputs 88 and 90. The electrical response signal from divider 86A is delivered to input 88, while the electrical response signal from divider 86B is delivered to input 90. Output 94 of comparator 92 is connected to optical cross-bar 76 to supply the result of the comparison between signals 70A and 70B for determining the routing of signals 68A and 68B.

The embodiment in FIG. 4 operates as follows. First, both signals 52A and 52B are split by couplers 56A and 56B to produce split optical signals 68A, 68B and 70A, 70B. Signals 68A and 68B pass through corresponding band-pass filters 80A and 80B which suppress reset pulse R and header pulse S allowing only data 12 to continue propagating to cross-bar 76.

Meanwhile, signals 70A and 70B are both partially reflected and transmitted by the corresponding filters 72A and 72B according to the characteristic graphs shown in FIG. 5A. Both partially reflected and transmitted portions of signals 70A and 70B are converted into photocurrents by photodiodes 84A, 82A, and 84B, 82B. The photocurrents are delivered to dividers 86A and 86B where a division is performed to ensure that the resulting electrical signal is only dependent on the wavelength of signals 70A and 70B.

In particular, divider 86A divides the photocurrents generated by photodiodes 82A and 84A as follows: transmitted portion of signal 70A/0.9×reflected portion of signal 70A. This operation eliminates any potential intensity effects and produces an electrical signal which is only dependent on the wavelength of signal 70A. The same operation is carried out by divider 86B.

Now, because the transmission and reflection characteristics of filters 80A and 80B only vary from $\lambda_L$ to $\lambda_U$ dividers 86A and 86B produce electrical response signals which are only sensitive to header pulse S and reset pulse R of signals 70A and 70B. Consequently, these electrical response signals are directly related to header wavelengths $\lambda_h$ and reset wavelengths $\lambda_r$ of signals 52A and 52B. Thus, by a simple comparison of the electrical response signals from dividers 86A and 86B comparator 92 determines which signal, 52A or 52B, has the larger header wavelength $\lambda_h$. As previously mentioned, data 12 contained in signals 70A and 70B will not interfere with this comparison.

Comparator 92 in the embodiment shown delivers a negative electrical signal at output 94 when header wavelength $\lambda_h$ of signal 52A is larger than header wavelength $\lambda_h$ of signal 52B. Otherwise, output 94 delivers a positive signal. Optical cross-bar 76 receives this positive or negative signal and adjusts the routing of signals 68A and 68B accordingly. In this embodiment a negative electrical signal from comparator 92 will cause signal 68A to be routed to output 78A and signal 68B to output 78B. Of course, cross-bar 76 can also be set up to respond to a negative electrical signal by sending signal 68A to output 78B and signal 68B to output 78A.

The time during which cross-bar 76 remains biased to produce the routing described above is set by header pulse S and terminated by reset pulse R. In other words, just as in the previous embodiment, header pulse S and reset pulse R create a temporal "window" for data 12 to be routed according to header wavelength $\lambda_h$. Moreover, this embodiment allows for simple up and down sorting of two optical signals. Again, data 12 does not have to undergo any opto-electrical conversions or decompression at all.

Figure 6:
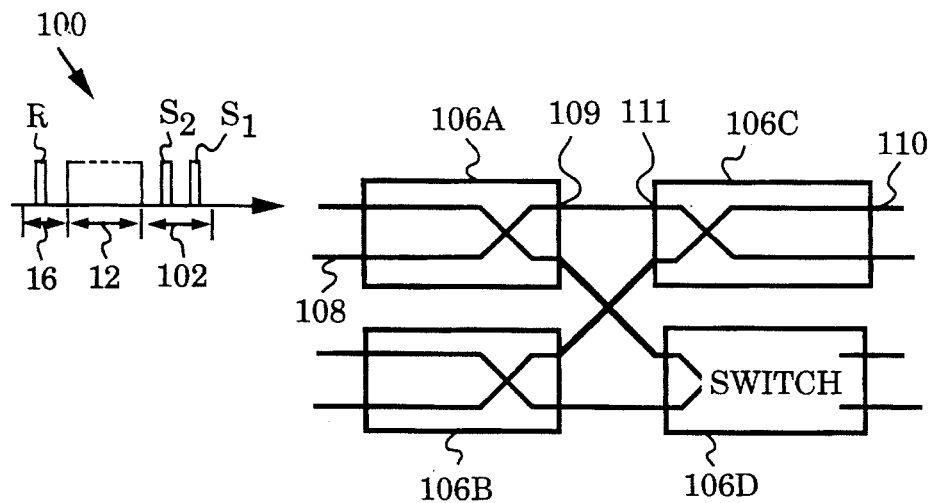
FIG. 6 is a schematic diagram of a simple optical network according to the invention.

FIG. 6 illustrates another embodiment of the invention building on both previous embodiments and utilizing the more complex data format shown in FIG. 2. In this case, full advantage is taken of enlarging the routing tag to include two header pulses $S_1$ and $S_2$ whose wavelengths $\lambda_{h1}$, $\lambda_{h2}$ are chosen from among four values (K=4) yielding sixteen possible routing tag combinations. In particular, the present embodiment uses an original optical signal 100 having a routing tag 102 with two header pulses $S_1$ and $S_2$, each characterized by a header wavelength $\lambda_{h1}$, $\lambda_{h2}$, and a reset pulse R having a reset wavelength $\lambda_r$.

The schematic diagram of FIG. 6 represents a simple optical network using two stages of 2×2 switches 106A, 106B, 106C, 106D. Stage one consists of switches 106A, 106B while stage two includes switches 106C, 106D. The interconnections between switches 106 allow for routing a signal arriving at any of four inputs 108 to any of four outputs 110. All switches 106 operate according to the principles explained in the previous embodiment. Each input 108 is designed to receive optical signal 100 or a copy thereof.

In the manner described, the values of header wavelength $\lambda_{h1}$ of header pulse $S_1$ are used by first stage switches 106A and 106B to properly route signal 100. In turn, the value of header wavelengths $\lambda_{h2}$ of header pulse $S_2$ are used by second stage switches 106C and 106D to properly route signals 100 to outputs 110. As before, the routing or latching arrangement of all switches 106 is preserved until reset pulse R is processed. This closes the "window" and prepares switches 106 for the next optical signal or set of four signals. Of course, many reset pulses R could be used. For example, one reset pulse could correspond to each header pulse in the routing tag. This would enable the setting of "windows" for each stage of a network as described in this embodiment. Appropriate solutions to such network problems are within the knowledge of those skilled in the art.

This embodiment can be effectively used to sort or route optical signals without performing any opto-electronic conversions of the optical data. In fact, the simple network shown of FIG. 6 can be enlarged into a network with more than two stages.

Figure 7:
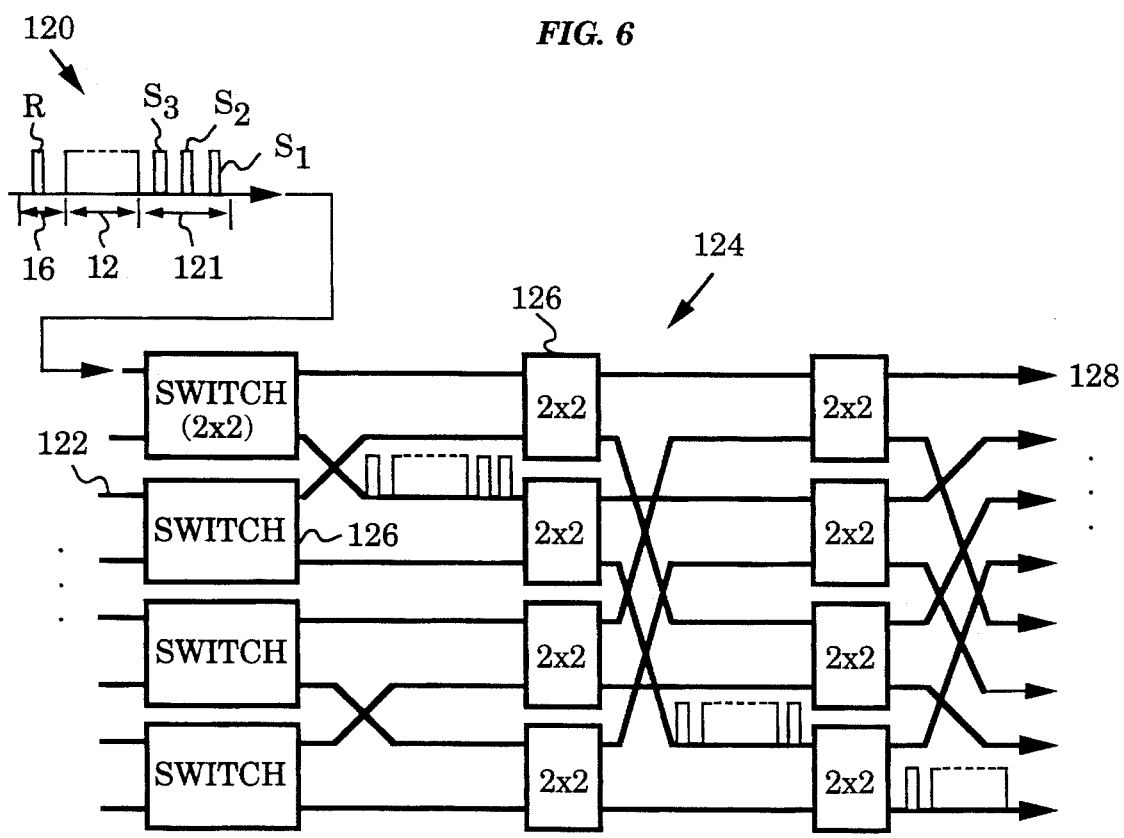
FIG. 7 is a block diagram of an optical banyan network according to the invention.

FIG. 7. illustrates how a three-stage network 124 of 2×2 switches 126 can be constructed to interconnect eight inputs 122 and eight outputs 128. In this case the optical signals need to have three header pulses $S_1$, $S_2$, $S_3$ with two possible values (K=2) for header wavelengths $\lambda_{h1}$, $\lambda_{h2}$, $\lambda_{h3}$. Each successive stage uses the successive header pulse for setting the "time window" for each of the switches in that stage. After use header pulses are chopped off before the next stage, as illustrated. Signal 120 shown at one of inputs 122 of network 124 has a routing tag 121 with three header pulses $S_1$, $S_2$, $S_3$. Before the next stage pulse $S_1$ is chopped off. Pulses $S_2$ and $S_3$ are chopped off before the following two stages respectively.

Figure 8:
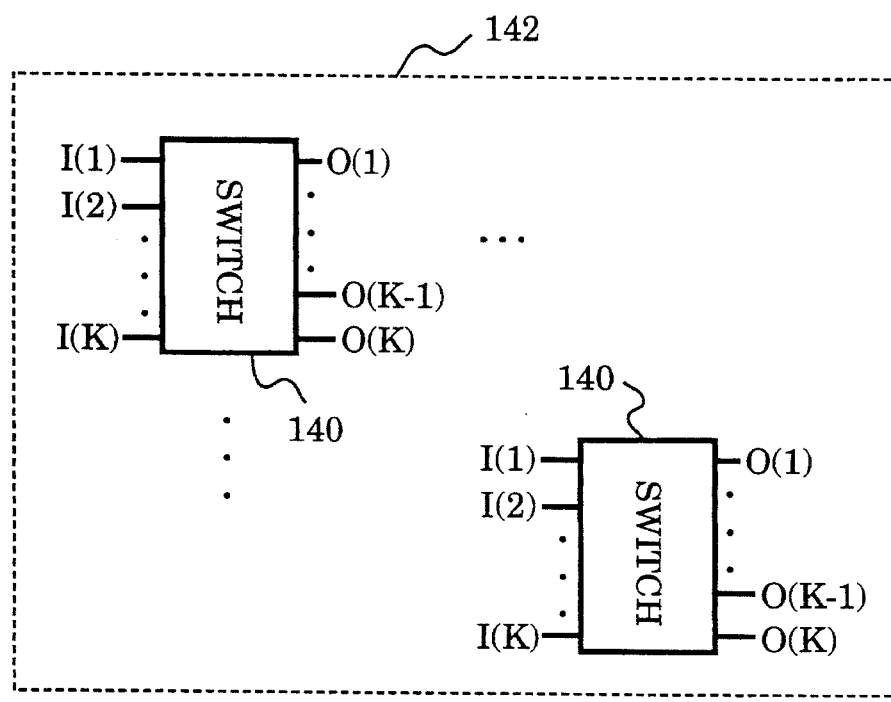
FIG. 8 is a block diagram generalized to show how to construct a complex optical network according to the invention.

A generalized diagram of a network 142 built with K×K optical switches 140 according to the invention is shown in FIG. 8. In the art, these types of networks are commonly called Banyan networks. Switches 140 of network 142 are arranged in $\log_K N$ stages with N/K switches per stage for routing a number N of optical signals from same number N of inputs to same number N of said outputs. The $\log_K N$ stages are interconnected as dictated by well-known rules for Banyan networks. Network 142 allows the use of $M^K$ different routing tags to achieve routing or sorting of optical signals. Since low-speed and low-power components can be used for transmitting, detecting, and processing the routing tag network 142 represents a very cost-effective optical network.

Figure 9:
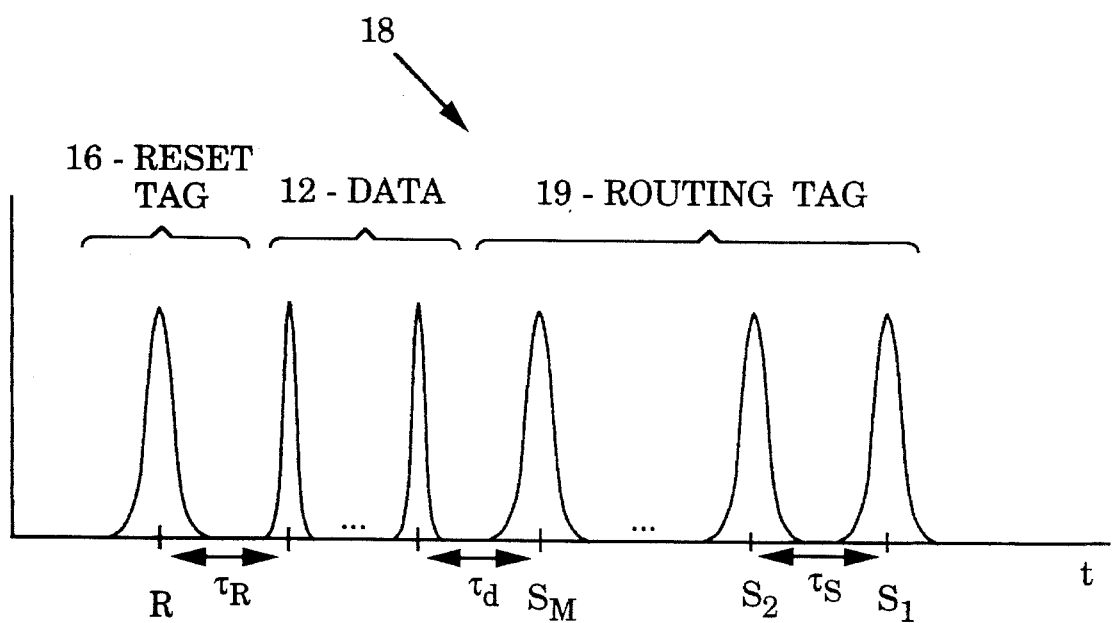
FIG. 9 is a detailed view of the formatted optical signal in FIG. 2.

FIG. 9 illustrates in detail the form of optical signal 18. In particular, it shows the separation between the various parts of originally formatted optical signal 18. As indicated, the nominal separation between individual header pulses S is equal to a header interval $\tau_s$. The time between the last header pulse $S_M$ and the first data bit of data 12 is equal to a data spacing $\tau_d$, and the time between the last bit of data 12 and reset pulse R is equal to a reset spacing $\tau_r$. These times are dictated by the optical dispersion of the optical communication lines carrying the optical signals. Typically, header interval $\tau_s$, data spacing $\tau_d$, and reset spacing $\tau_r$ range between several tens of nanoseconds to a microsecond.

Although not explicitly shown in FIG. 9, each header pulse S and reset pulse R can consist of several wavelengths. For example, Header pulse $S_1$ can contain two header wavelengths $\lambda_{h1}$, $\lambda_{h1'}$. Since light pulses can be stacked in the same physical space an arbitrary number of wavelengths can be packed into any pulse. Appropriate changes to the opto-electronic circuits would be obvious to one skilled in the art.

Figure 10:
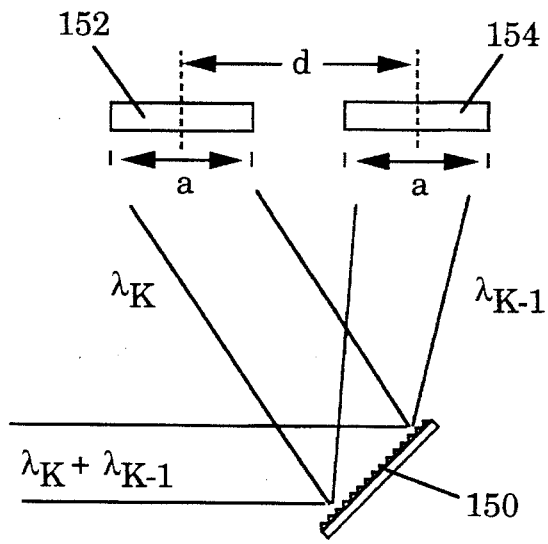
FIG. 10 is a ray diagram showing the resolution of two header wavelengths of an optical signal formatted according to the invention.

FIGS. 10–13 show the practical limitations of a wavelength-coded and self-routed optical network according to the invention. FIG. 10 illustrates two header wavelengths $\lambda_K$ and $\lambda_{K-1}$ of an optical signal being resolved by a grating 150. A practical smallest wavelength difference between adjacent wavelengths is $\lambda_K$ and $\lambda_{K-1}$ is 1 nm or somewhat less. Two sensors 152 and 154, each having an aperture a, are positioned above grating 150 to receive resolved wavelengths $\lambda_K$ and $\lambda_{K-1}$. The distance between the centers of sensors 152 and 154 is d. In this case the value of d is 128 µm. Aperture a of each sensor in this example can range between 80 µm to 120 µm.

The conditions shown in FIG. 10 are ideal, since wavelengths $\lambda_K$ and $\lambda_{K-1}$ are perfectly resolved. This means that sensors 152 and 154 are receiving the peak power Pi possible from the given wavelength impinging on them. In practice, however, wavelength values wander, waveguiding elements introduce dispersion, and aberrations of optical systems compound the problems. This affects the value and time of arrival of wavelengths $\lambda_K$ and $\lambda_{K-1}$. Thus, in practical conditions, wavelengths $\lambda_K$ and $\lambda_{K-1}$ may overlap in time and space. Consequently, a system has to be designed for properly resolving the different wavelengths of headers and resets of optical signals.

Figure 11:
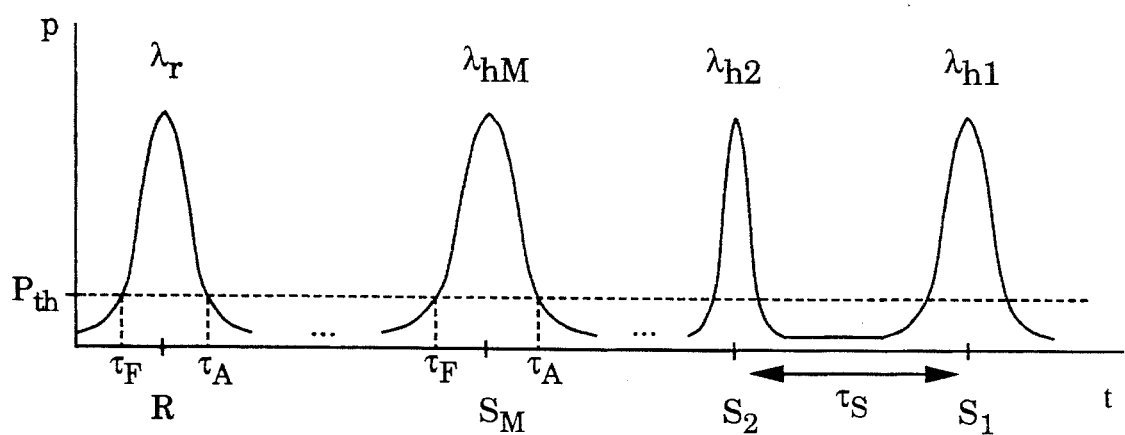
FIG. 11 is a graph illustrating the operation of optical threshold detection mode of header and reset wavelengths.

FIG. 11 shows an ideal situation where header pulses $S_1$, $S_2$, ... $S_M$, and reset pulse R arrive temporally resolved by a time $\tau_s$ at a particular sensor. The sensor is set to register any wavelength whose power intensity rises above a threshold power $P_{th}$. Such thresholds are frequently directly related to the limit of sensitivity of the given type of sensor. No signal will be detected unless it exceeds threshold power $P_{th}$. In particular, to be detected by the sensor the latter must register and increase of impinging power intensity past $P_{th}$ and set a flag time $\tau_F$ and subsequent drop of power below $P_{th}$ at which time, $\tau_A$, the sensor activates and produces an electrical signal.

Figure 12:
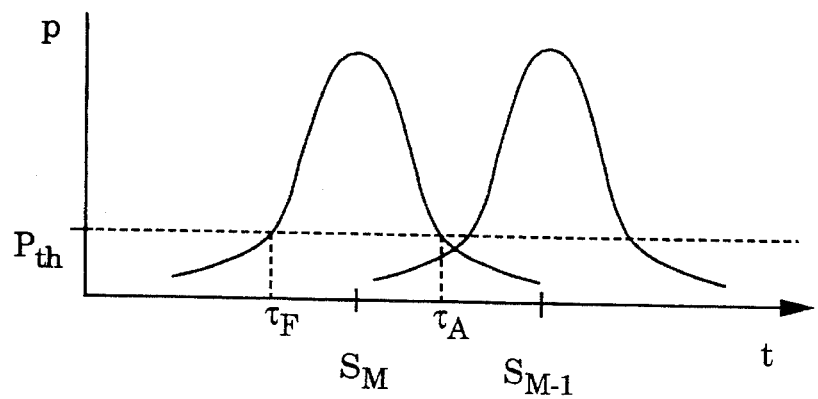
FIG. 12 is a detailed graph illustrating the resolution limit in the threshold detection mode.

FIG. 12 shows the limit of resolution of the threshold-based sensor. Two signals of wavelengths $\lambda_1$ and $\lambda_2$ overlap in time and, because of dispersion, their originally different wavelengths are sufficiently close that both are projected by a grating to the same sensor, i.e., $\lambda_1=\lambda_2$. The trailing edge of signal $\lambda_1$ crosses the rising edge of signal $\lambda_2$. Consequently, signals $\lambda_1$ and $\lambda_2$ will remain resolved as long as the trailing edge of signal $\lambda_1$ and rising edge of signal $\lambda_2$ superpose to give a combined power intensity which is below threshold power $P_{th}$. That is because a dip below threshold power $P_{th}$ will cause the sensor to be activated at time $\tau_A$.

Figure 13:
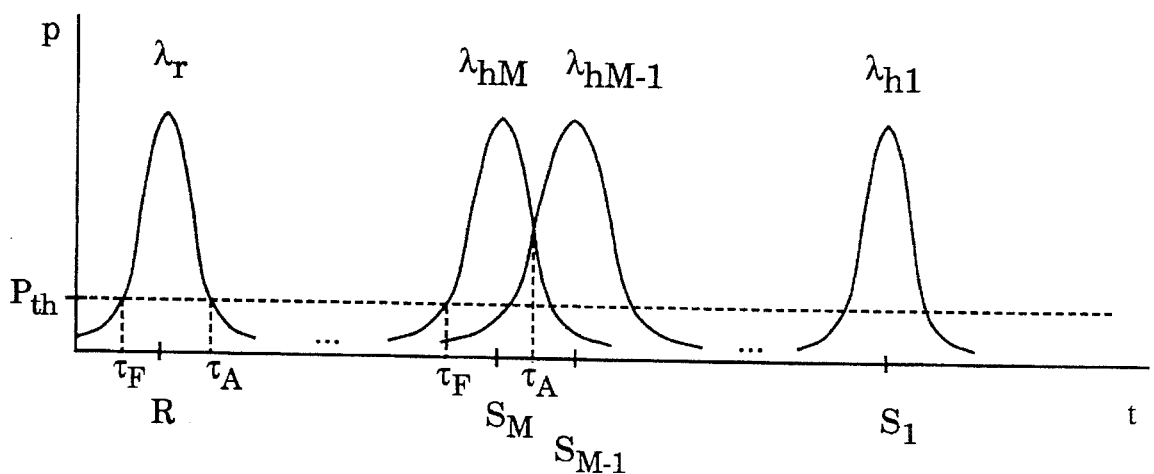
FIG. 13 is a graph illustrating the operation of cross-channel optical signal comparison mode.

FIG. 13 illustrates how a sensor can be hooked up to operate in a comparison mode. Just like in the above case, the sensor has a power threshold $P_{th}$. Two signals of wavelengths $\lambda_{hM}$ and $\lambda_{hM-1}$ are resolved as follows. The rising flank of signal $\lambda_{hM}$ causes a flag to be set at time $\tau_F$ when the intensity exceeds power threshold $P_{th}$. Thereafter, the sensor is programmed to activate the sensor at time $\tau_A$ when the intensity of signal $\lambda_{hM}$ starts dropping off. This means that as long as there is a "hump" between signals $\lambda_{hM}$ and $\lambda_{hM-1}$ the two can be resolved.

The necessary programming and electrical circuitry to practice both the threshold and comparison modes are within the capacities of a person skilled in the art.

Figure 14:
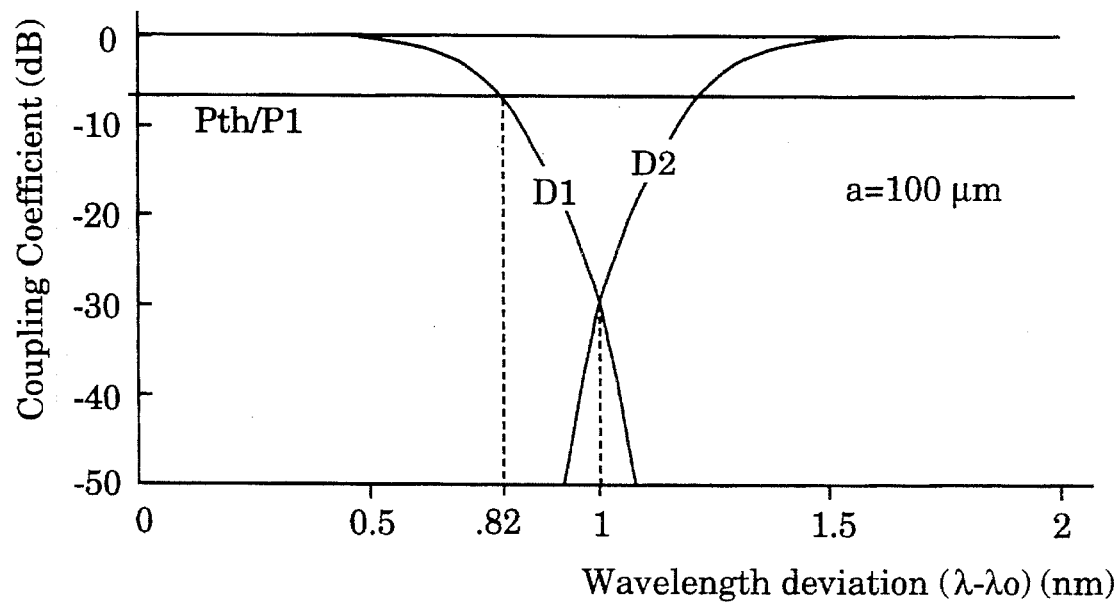
FIG. 14 is a graph depicting maximum allowable wavelength deviations for header and reset wavelengths for a wavelength spacing of 2 nm.

Finally, FIGS. 14–17 show the results obtained in implementing the invention. In particular, FIG. 14 is a graph illustrating the maximum allowable wavelength deviations between two adjacent wavelengths or channels for both the threshold and comparison modes. The sensor set-up is as shown in FIG. 10. The graph marked D1 indicates the signal generated by sensor 152, and the graph marked D2 indicates the signal generated by the adjacent sensor 154.

Aperture a is 100 µm and the separation between adjacent wavelengths, i.e., channel spacing, is 2 nm. The thresholding mode allows a wavelength deviation $\lambda-\lambda_0$ of 0.82 nm, where $\lambda_0$ is the original wavelength and $\lambda$ is the received wavelength. Meanwhile, the comparison mode allows sensors 152 and 154 to distinguish adjacent channels when the wavelength deviation is 1 nm.

Figure 15:
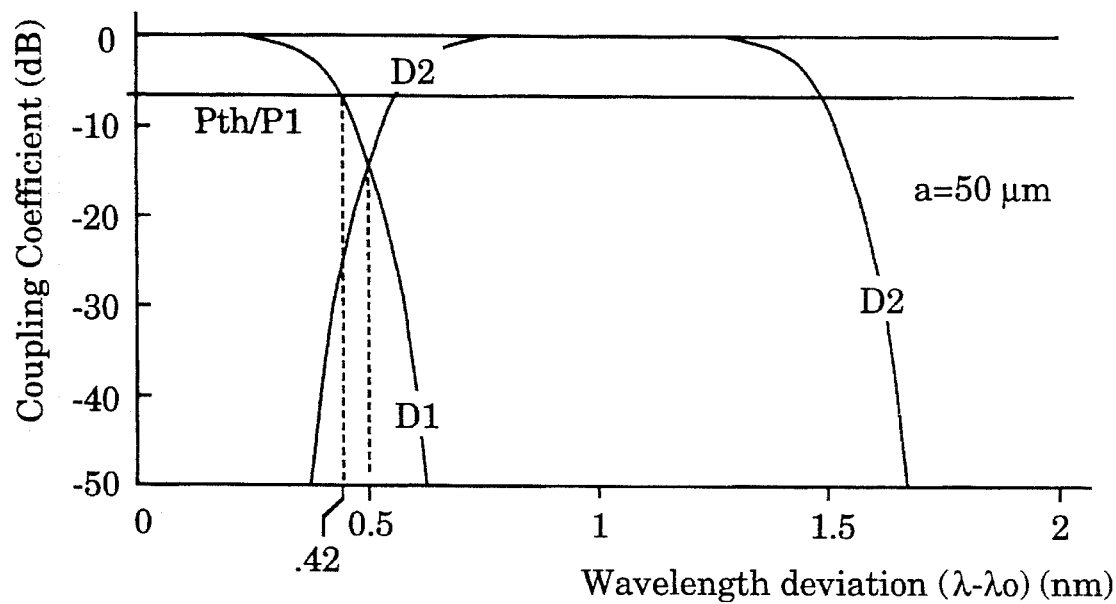
FIG. 15 is a graph depicting maximum wavelength deviations for header and reset wavelengths for a wavelength spacing on 1 nm.

FIG. 15 shows a similar graph for a different parameters. In particular, the size of aperture a is 50 µm and channel spacing is reduced to 1 nm. Again, the comparison mode proves to be superior to the thresholding mode by allowing for wavelength deviation up to 0.5 nm in comparison to 0.42 nm for thresholding operation.

Figure 16:
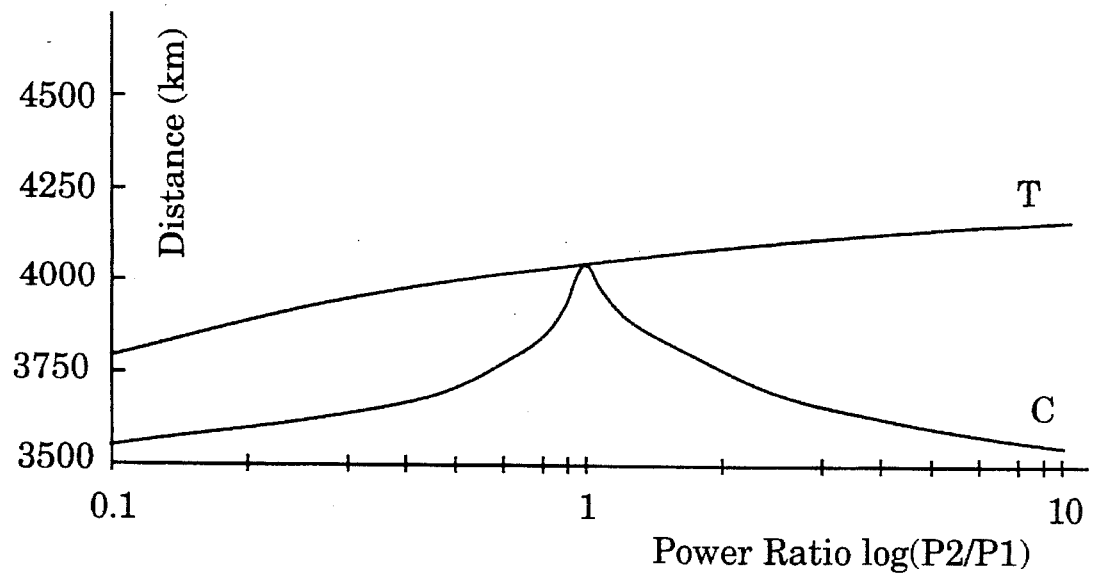
FIG. 16 is a graph illustrating the distance across which optical data formatted according to the invention can be safely transmitted.
Figure 17:
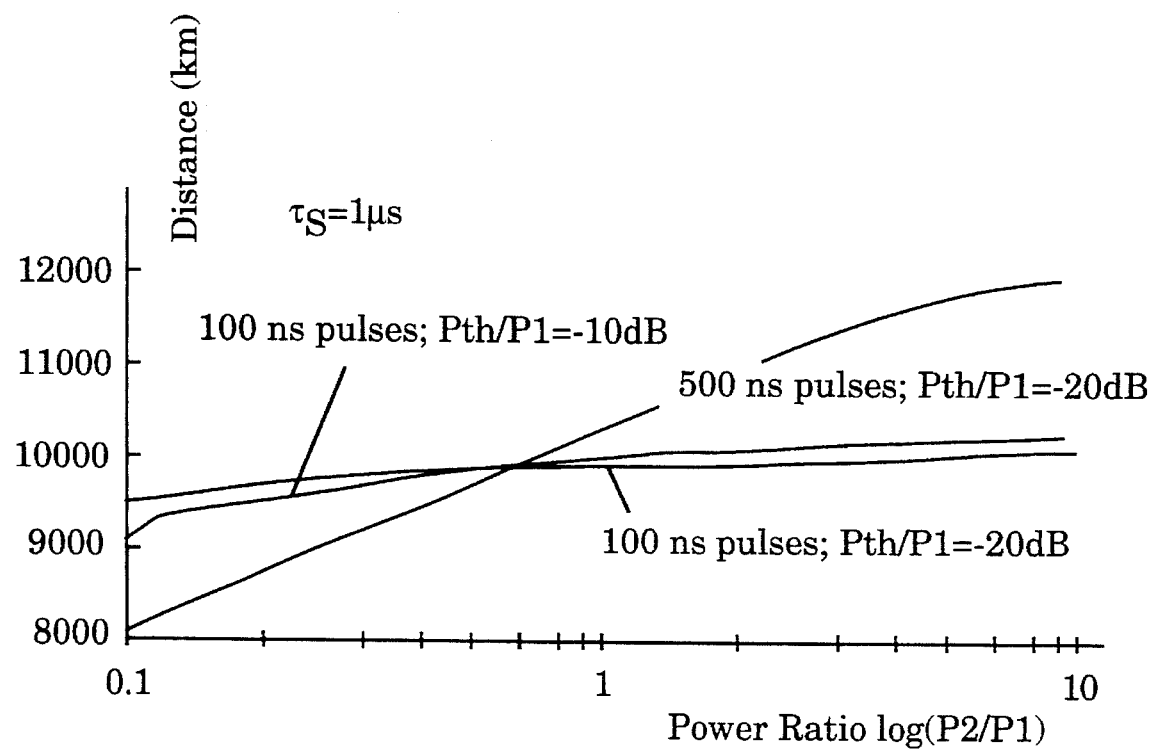
FIG. 17 is another graph illustrating transmission distances for optical signals formatted according to the invention.

FIG. 16 and FIG. 17 show the longest distance that routing tags can travel. This distance is limited primarily by dispersion, assuming losses can be compensated by amplifiers. The distance is graphed as a function of the logarithm of the power ratio (P2/P1) between two sequential pulses corresponding to header pulses $S_2$ and $S_1$. The maximum wavelength difference between the two pulses is 10 nm and the dispersion constant is 10 ps/nm×km (for 1.5 µm wavelength). Graph T relates to detection in the threshold mode explained above and graph C to detection in the comparison mode. Meanwhile, FIG. 17 shows the distance which routing tags can travel for various pulse lengths and periods. The dispersion constant and channel spacing is the same as in FIG. 16. Other parameters are indicated in the figure for clarity.

SUMMARY, RAMIFICATIONS, AND SCOPE

The above embodiments serve but to outline of the invention and are not to be construed as limiting its scope. Many additional changes can be introduced to both the format of optical data and structure of the network described above.

The header and reset pulses can be coded with additional information. For example, a header wavelength $\lambda_h$ can include a binary sequence modulated onto it by appropriate optical instruments. The same is true for any reset wavelength. The additional binary sequence can contain unique information to further characterize the pulse. In case of reset pulses a more unique pulse defined with binary data is very desirable. That is because it is highly unlikely for any system disturbance or malfunction could accidentally produce a signal like the reset and trigger shut-down of optical switches. The appropriate changes to the opto-electronic circuits can easily be made by one skilled in the art.

Also, it is possible to only use header pulses without any reset pulses at all. In such situations the header pulse of the successive optical signal would serve both as a routing signal for this next signal and reset. Obviously, the switch would never be turned off in such operating mode.

Therefore, the scope of the invention should be determined, not by examples given, but by the appended claims and their legal equivalents.

We claim:

1. An apparatus for routing an optical signal provided with a wavelength-coded routing tag comprising at least one header pulse $S_i$ having at least one header wavelength $\lambda_{hi}$, a set of optical data following said wavelength-coded routing tag, a reset pulse R having at least one reset wavelength $\lambda_r$ and following said set of optical data, wherein said apparatus comprises:

a) a splitting means for splitting said optical signal into at least two split optical signals which are copies of said optical signal;

b) a wavelength differentiating means positioned in the path of at least one of said split optical signals for determining said at least one header wavelength $\lambda_{hi}$ and for determining said at least one reset wavelength $\lambda_r$;

c) an opto-electronic control system for converting said at least one header wavelength $\lambda_{hi}$ and said at least one reset wavelength $\lambda_r$ determined by said wavelength differentiating means into electrical signals and for generating from the electrical signals electronic control signals; and d) an optical switching means in communication with said opto-electronic control system for altering the path of at least one of said at least two split optical signals in response to said electronic control signals.

2. The apparatus of claim 1 wherein said splitting means is chosen from the group consisting of unequal couplers and beam splitters and splits said optical signal into two split optical signals comprising a high intensity optical signal and a low intensity optical signal, and said unequal coupler directs said low intensity optical signal to said wavelength differentiating means and said high intensity optical signal to said optical switching means.

3. The apparatus of claim 2 further comprising a filter, positioned in the path of said low intensity optical signal before said opto-electronic control system, for providing a transmitted signal and a reflected signal, and wherein said opto-electronic control system comprises a comparator for deriving said electronic control signals from a predetermined ratio of intensities between said transmitted signal and said reflected signal, whereby said electronic control signals depend exclusively on the wavelength of said low intensity optical signal.

4. The apparatus of claim 2 further comprising a gating means positioned in the path of said high intensity optical signal for eliminating at least one of said header pulses $S_i$.

5. The apparatus of claim 1 wherein said optical switching means comprises an optical switch having at least one input and a plurality of outputs, and said switch is latched in a predetermined setting by one of said electrical control signals generated in response to said at least one header wavelength $\lambda_{hi}$ to pass at least one of said optical signals from one of said inputs to one of said outputs, and said switch is deactivated by one of said electrical control signals generated in response to said at least one reset wavelength $\lambda_r$.

6. The apparatus of claim 5 wherein said optical switch has one input and a number K of outputs, and said at least one header pulse $S_i$ contains one header wavelength, and the number of possible values for said header wavelength $\lambda_{hi}$ is equal to same number K.

7. The apparatus of claim 5 wherein said optical switch is chosen from the group consisting of LiNbO$_3$ directional couplers, optical shutters, semiconductor waveguide directional couplers, semiconductor Y-branch switches, semiconductor amplifier gating switches, polarizing liquid crystal switches, and mechanical switches.

8. The apparatus of claim 1 wherein said wavelength differentiating means is a grating positioned to angularly resolve and project said at least one header wavelength $\lambda_{hi}$ and said at least one reset wavelength $\lambda_r$ onto said opto-electronic control system, said at least one header wavelength $\lambda_{hi}$ having an integral number of possible discrete wavelength values, and said opto-electronic control system comprises a set of photoelectric detectors positioned to receive said at least one header wavelength $\lambda_{hi}$ and at least one reset wavelength $\lambda_r$.

9. The apparatus of claim 8 and wherein said set of photoelectric detectors is arranged in an array such that each photoelectric detector is positioned to receive a particular wavelength from among all of the possible discrete wavelength values of said header wavelength $\lambda_{hi}$ and said reset wavelength $\lambda_r$.

10. The apparatus of claim 9 wherein each of said photoelectric detectors has a detection threshold, and said electronic control signals are generated by each of said photoelectric detectors when the intensity of the wavelength which said photoelectric detector is positioned to receive exceeds said detection threshold and then drops below said detection threshold.

11. The apparatus of claim 9 wherein each of said photoelectric detectors has a predetermined detection threshold, and said electronic control signals are generated by each of said photoelectric detectors when the intensity of the wavelength which said photoelectric detector is positioned to receive exceeds said detection threshold and then attains a value equal to the intensity of a different wavelength detected by another of said photoelectric detectors.

12. The apparatus of claim 8 wherein said photoelectric detectors are chosen from the group consisting of photodiodes, charge-coupled devices, and phototransistors.

13. An apparatus for routing optical signals each provided with a wavelength-coded routing tag comprising at least one header pulse $S_i$ having a header wavelength $\lambda_{hi}$, a set of optical data following said wavelength-coded routing tag, a reset pulse R having a reset wavelength $\lambda_r$ and following said set of optical data, wherein said apparatus comprises:

a) a splitting means for splitting each of said optical signals into at least two split optical signals to produce copies of each of said optical signals;

b) a wavelength differentiating means positioned in the path of at least one of said split optical signals from each of said optical signals for detecting said at least one header pulse $S_i$ and said reset pulse R;

c) an opto-electronic control system for converting said at least one header pulse $S_i$ and said reset pulse R detected by said wavelength differentiating means into electrical signals and for generating from the electrical signals, within a response time, electronic control signals; and d) an optical switching means in communication with said opto-electronic control system for altering the path of at least one of said at least two split optical signals from each of said optical signals in response to said electronic control signals.

14. The apparatus of claim 13 wherein said optical switching means comprises a plurality of optical switches having inputs and outputs, and each of said switches is latched in a predetermined setting by one of said electrical control signals generated in response to said at least one header pulse $S_i$ to pass said set of optical data from one of said inputs to one of said outputs, and is deactivated by one of said electrical control signals generated in response to said reset pulse R.

15. The apparatus of claim 14 wherein each of said optical switches has a number K of inputs and same number K of outputs, each of said K inputs receiving an optical signal, and said at least one header pulse $S_i$ having same number K of possible wavelength values for said header wavelength $\lambda_{hi}$.

16. The apparatus of claim 15 wherein said optical switches form a banyan network having a number M of said header pulses $S_i$ and a number of $\log_K N$ stages with N/K switches per stage for routing a number N of optical signals from same number N of inputs to same number N of said outputs.

17. A method for wavelength-coding of optical signals for self-routing in an optical network, said network comprising a splitting means for splitting said optical signal into at least two split optical signals, a wavelength differentiating means for determining the wavelengths comprising said optical signal, an opto-electronic control system for converting the wavelengths into electrical signals and for generating from the electrical signals electronic control signals, and an optical switching means in communication with said opto-electronic control system for altering the path of at least one of said at least two split optical signals in response to said electronic control signals, said method comprising the following steps:

a) identifying a set of optical data for self-routing;

b) adding before said set of optical data a routing tag comprising at least one header pulse $S_i$ having at least one header wavelength $\lambda_{hi}$ chosen from among an integral number K of wavelength values;

c) adding after said set of optical data at least one reset pulse R having at least one reset wavelength $\lambda_r$ chosen from a predetermined number of wavelengths.

18. The method of claim 17 wherein a number M of said header pulses $S_i$ is added.

19. The method of claim 18 wherein said header pulses $S_i$ are added at predetermined header intervals $\tau_s$, and precede said set of optical data by a data spacing $\tau_d$ substantially equal to said header intervals $\tau_s$, and said reset pulse R is added after a reset spacing $\tau_r$ behind said set of optical data.

20. The method of claim 17 wherein said at least one reset wavelength $\lambda_r$ is chosen from among same integral number K of wavelength values as said at least one header wavelength $\lambda_{hi}$.

21. An apparatus for routing an optical signal provided with a wavelength-coded routing tag comprising at least one header pulse $S_i$ having at least one header wavelength $\lambda_{hi}$, a set of optical data following said wavelength-coded routing tag, wherein said apparatus comprises:

a) a splitting means for splitting said optical signal into at least two split optical signals which are copies of said optical signal;

b) a wavelength differentiating means positioned in the path of at least one of said split optical signals for determining said at least one header wavelength $\lambda_{hi}$;

c) an opto-electronic control system for converting said at least one header wavelength $\lambda_{hi}$ into an electrical signal and for generating from the electrical signal electronic control signals; and d) an optical switching means in communication with said opto-electronic control system for altering the path of at least one of said at least two split optical signals in response to said electronic control signals.

22. The apparatus of claim 21 wherein said optical switching means comprises an optical switch having at least one input and a plurality of outputs, and said optical switch is latched in a predetermined setting by one of said electrical control signals to pass at least one of said optical signals from one of said inputs to one of said outputs.

* * * * *